(12) United States Patent
Namikawa et al.

(10) Patent No.: US 11,325,642 B2
(45) Date of Patent: May 10, 2022

(54) STEERING APPARATUS

(71) Applicant: JTEKT CORPORATION, Osaka (JP)

(72) Inventors: Isao Namikawa, Okazaki (JP); Koji Anraku, Okazaki (JP); Yusuke Kakimoto, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 274 days.

(21) Appl. No.: 16/825,328

(22) Filed: Mar. 20, 2020

(65) Prior Publication Data

US 2020/0307686 A1    Oct. 1, 2020

(30) Foreign Application Priority Data

Mar. 28, 2019 (JP) .............................. JP2019-062604

(51) Int. Cl.
| | |
|---|---|
| *B62D 6/00* | (2006.01) |
| *B62D 5/00* | (2006.01) |
| *B62D 5/04* | (2006.01) |
| *G07C 5/08* | (2006.01) |

(52) U.S. Cl.
CPC .............. *B62D 6/008* (2013.01); *B62D 5/006* (2013.01); *B62D 5/0481* (2013.01); *B62D 5/0409* (2013.01); *B62D 5/0424* (2013.01); *G07C 5/0816* (2013.01)

(58) Field of Classification Search
CPC ...... B62D 6/008; B62D 5/006; B62D 5/0481; B62D 5/0424
See application file for complete search history.

(56) References Cited

U.S. PATENT DOCUMENTS

| | | | | |
|---|---|---|---|---|
| 8,725,356 | B2 * | 5/2014 | Ishihara ................. | B62D 5/006 |
| | | | | 701/41 |
| 8,843,276 | B2 * | 9/2014 | Kojo ...................... | B62D 5/008 |
| | | | | 180/443 |
| 2006/0080016 | A1 | 4/2006 | Kasahara et al. | |
| 2020/0269907 | A1 * | 8/2020 | Namikawa ........... | B62D 15/025 |
| 2020/0298908 | A1 * | 9/2020 | Namikawa ........... | B62D 15/029 |

FOREIGN PATENT DOCUMENTS

| | | |
|---|---|---|
| DE | 10261001 A1 | 7/2004 |
| EP | 1035001 A2 | 9/2000 |
| JP | 2006-111099 A | 4/2006 |

OTHER PUBLICATIONS

Aug. 31, 2020 Search Report issued in European Patent Application No. 20165455.5.

* cited by examiner

*Primary Examiner* — Tony H Winner
(74) *Attorney, Agent, or Firm* — Oliff PLC (57) ABSTRACT

A steering apparatus includes: a mechanism that turns a turning wheel; a first motor that generates a driving force that is given to the mechanism; and a control device. The control device includes: a first computation circuit that computes a first limiting value to which an electric current to be supplied to the first motor is limited in a particular situation; a determination circuit that determines whether the turning wheel is in touch with an obstacle; a second computation circuit that computes a second limiting value to which the electric current to be supplied to the first motor is limited when the determination circuit determines that the turning wheel is in touch with the obstacle; and a third computation circuit that computes the threshold to be used by the determination circuit, based on a smaller limiting value of the first limiting value and the second limiting value.

7 Claims, 7 Drawing Sheets

STEERING APPARATUS

CROSS-REFERENCE TO RELATED APPLICATION

This application claims priority to Japanese Patent Application No. 2019-062604 filed on Mar. 28, 2019, incorporated herein by reference in its entirety.

BACKGROUND

1. Technical Field

The disclosure relates to a steering apparatus.

2. Description of Related Art

There is a so-called steer-by-wire type steering apparatus in which dynamic power transmission between a steering wheel and turning wheels is separated. The steering apparatus includes a reaction motor as a generation source of a steering reaction force that is given to a steering shaft, and a turning motor as a generation source of a turning force by which the turning wheels are turned. At the time of traveling of a vehicle, a control device of the steering apparatus generates the steering reaction force through an electricity supply control of the reaction motor, and turns the turning wheels through an electricity supply control of the turning motor.

The steering apparatus can get, for example, into a situation where it is difficult to turn the turning wheels to a steering increase side, as exemplary by a situation where a turning wheel abuts on a curbstone at the time of stationary steering. At this time, the control device of the steering apparatus attempts to cause the turning angle of the turning wheel to follow up the steering angle of the steering wheel. Therefore, an excessive electric current is supplied to the turning motor, and thereby, the turning motor or a drive circuit for the turning motor may overheats.

Hence, for example, a control device in Japanese Patent Application Publication No. 2006-111099 determines that the turning wheel is in contact with an obstacle, when a prescribed determination condition is satisfied. For example, the determination condition includes a condition that the actual current value supplied to the turning motor is equal to or larger than a current threshold continuously for a predetermined time. When it is determined that the turning wheel is in contact with the obstacle, the control device executes a control prescribed for restraining the overheating of the turning motor.

SUMMARY

Some control devices have not only the function to restrain the overheating of the turning motor due to the contact of the turning wheel with the obstacle, but also, for example, a function to restrain the overheating of the turning motor caused by the temperature of the turning motor. The control device monitors the temperature of the turning motor, and when the temperature is close to a temperature in the overheating state, the control device limits the current amount to be supplied to the turning motor. The situation where the control device limits the current amount to be supplied to the turning motor in this way can be a situation where a power-supply voltage has decreased, or a situation where a pull-in current has increased.

Therefore, for example, when the turning wheel is in contact with the obstacle at the time of the stationary steering for the start of the vehicle, the current amount to be supplied to the turning motor may be limited before the current value of the turning motor reaches the current threshold. In this case, since the current value of the turning motor does not reach the current threshold, there is a concern that the contact of the turning wheel with the obstacle is not properly detected.

The disclosure provides a steering apparatus that can properly detect the contact of the turning wheel with the obstacle.

An aspect of the disclosure is a steering apparatus. The steering apparatus includes a mechanism, a first motor, and a control device. The mechanism is configured to turn a turning wheel of a vehicle. The first motor is configured to generate a driving force that is given to the mechanism. The control device is configured to control the first motor in accordance with a steering state. The control device includes a first computation circuit, a determination circuit, a second computation circuit, a third computation circuit. The first computation circuit is configured to compute a first limiting value to which an electric current to be supplied to the first motor is limited in a particular situation. The determination circuit is configured to determine whether the turning wheel is in touch with an obstacle, based on comparison between the value of the electric current to be supplied to the first motor and a threshold. The second computation circuit is configured to compute a second limiting value to which the electric current to be supplied to the first motor is limited when the determination circuit determines that the turning wheel is in touch with the obstacle. The third computation circuit is configured to compute the threshold to be used by the determination circuit, based on a smaller limiting value of the first limiting value and the second limiting value.

With this configuration, in the case where the turning wheel is in touch with the obstacle, the current amount to be supplied to the motor is limited to the limiting value that is one of the first limiting value and the second limiting value and that has the smaller absolute value. Thereby, the rise in the temperature of the motor is restrained. Further, in the case where the turning wheel is in touch with the obstacle, the threshold to be used by the determination circuit is computed based on the limiting value that is one of the first limiting value and the second limiting value and that has the smaller absolute value. Therefore, even when the current value of the motor is limited, the threshold is restrained from being set to a value larger than the current value of the motor. Accordingly, it is possible to properly determine that the turning wheel is in touch with the obstacle, from the comparison between the current value of the motor and the threshold.

In the above steering apparatus, the third computation circuit may be configured to compute the threshold having a value equal to the smaller limiting value of the first limiting value and the second limiting value.

With this configuration, even when the current value of the motor is limited, the threshold is restrained from being set to a value larger than the current value of the motor. In the above steering apparatus, the second computation circuit may be configured to decrease the second limiting value from a maximal limiting value to a minimal limiting value, when the determination circuit determines that the turning wheel is in touch with the obstacle, the maximal limiting value being set based on a maximal current value that the first motor is able to apply without overheating, the minimal limiting value being set based on a minimal current value that the first motor is able to apply without overheating.

With this configuration, in the case where the turning wheel is in touch with the obstacle, the second limiting value decreases from the maximal limiting value to the minimal limiting value. Therefore, it is possible to limit the electric current of the motor, at least to the minimal limiting value as the second limiting value.

In the above steering apparatus, the second computation circuit may be configured to immediately restore the second limiting value from the minimal limiting value to the maximal limiting value, when the determination circuit cancels the determination that the turning wheel is in touch with the obstacle.

With this configuration, it is possible to reduce a period during which turning performance decreases due to the limitation of the electric current of the motor for protection of the motor from overheating, to a minimal period. The steering apparatus may further includes a second motor. The mechanism may include a steering shaft configured to rotate in conjunction with an operation of a steering wheel and a turning shaft provided such that dynamic power transmission between the steering wheel and the turning shaft is separated. The second motor may be a reaction motor configured to generate a steering reaction force based on a first command value that is computed based on the steering state. The steering reaction force may be a torque that is given to the steering shaft and that is an opposite direction of a steering direction. The first motor may be a turning motor configured to generate a turning force based on a second command value that is computed based on the steering state. The turning force may be a torque that is given to the turning shaft and by which the turning wheel is turned.

In this case, the control device may include a limiting shaft force computation circuit configured to compute a limiting shaft force as a shaft force of the turning shaft, as a control for informing a driver that the turning wheel is in touch with the obstacle, when the determination circuit determines that the turning wheel is in touch with the obstacle, the shaft force of the turning shaft being reflected in the first command value for the reaction motor for virtually limiting the operation of the steering wheel.

With this configuration, in the case where the turning wheel is in touch with the obstacle, the limiting shaft force for virtually limiting the operation of the steering wheel is reflected in the first command value for the reaction motor. Thereby, the driver has a feeling of contact as the steering reaction force. From a sensation in driver's hands through the steering wheel, the driver can recognize the situation where the turning wheel is in touch with the obstacle. In addition, it is possible to virtually limit the operation of the steering wheel by the driver.

In the above steering apparatus, the control device may include: an ideal shaft force computation circuit configured to compute an ideal shaft force, the ideal shaft force being an idealized shaft force of the turning shaft based on a target rotation angle of a rotating body that rotates in conjunction with a turning action of the turning wheel; an estimated shaft force computation circuit configured to compute a shaft force of the turning shaft as an estimated shaft force, based on a current value of the turning motor that reflects a vehicle behavior, a road surface state or the steering state; and a distribution computation circuit configured to compute a mixed shaft force as the shaft force of the turning shaft, by mixing the estimated shaft force and the ideal shaft force based on the vehicle behavior, the road surface state or the steering state, the shaft force of the turning shaft being reflected in the first command value for the reaction motor.

In this case, the distribution computation circuit may be configured to switch the shaft force of the turning shaft from the mixed shaft force to the estimated shaft force, as a control for informing a driver that the turning wheel is in touch with the obstacle, when the determination circuit determines that the turning wheel is in touch with the obstacle, the shaft force of the turning shaft being reflected in the first command value for the reaction motor.

With this configuration, in the case where the turning wheel is not in touch with the obstacle, the mixed shaft force obtained by mixing the ideal shaft force based on the target rotation angle of the rotating body and the estimated shaft force based on the current value of the turning motor depending on the vehicle behavior or the like is reflected in the first command value for the reaction motor. Therefore, the reaction motor generates the driving force corresponding to the mixed shaft force. On the other hand, in the case where the turning wheel is in touch with the obstacle, only the estimated shaft force is reflected in the first command value for the reaction motor. The estimated shaft force reflects the vehicle behavior, the road surface state or the steering state, and therefore the motor generates the driving force corresponding to the shaft force that acts on the turning shaft due to the touch of the turning wheel with the obstacle. Accordingly, the driver has a feeling of contact as the steering reaction force through the steering wheel, and thereby can recognize the situation where the turning wheel is in touch with the obstacle.

With the steering apparatus in the disclosure, it is possible to properly detect the contact of the turning wheel with the obstacle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

An upper diagram of FIG. 6 is a graph showing a relation between a count value that is computed in the limiting value computation circuit and a limiting value in the first embodiment, and a lower diagram of FIG. 6 is a graph showing an exemplary timing when the value of a flag that is set by a determination circuit switches from "0" to "1" in the first embodiment.

DETAILED DESCRIPTION OF EMBODIMENTS

First Embodiment

A first embodiment in which a steering apparatus is applied to a steer-by-wire type steering apparatus will be described below.

Figure 1:
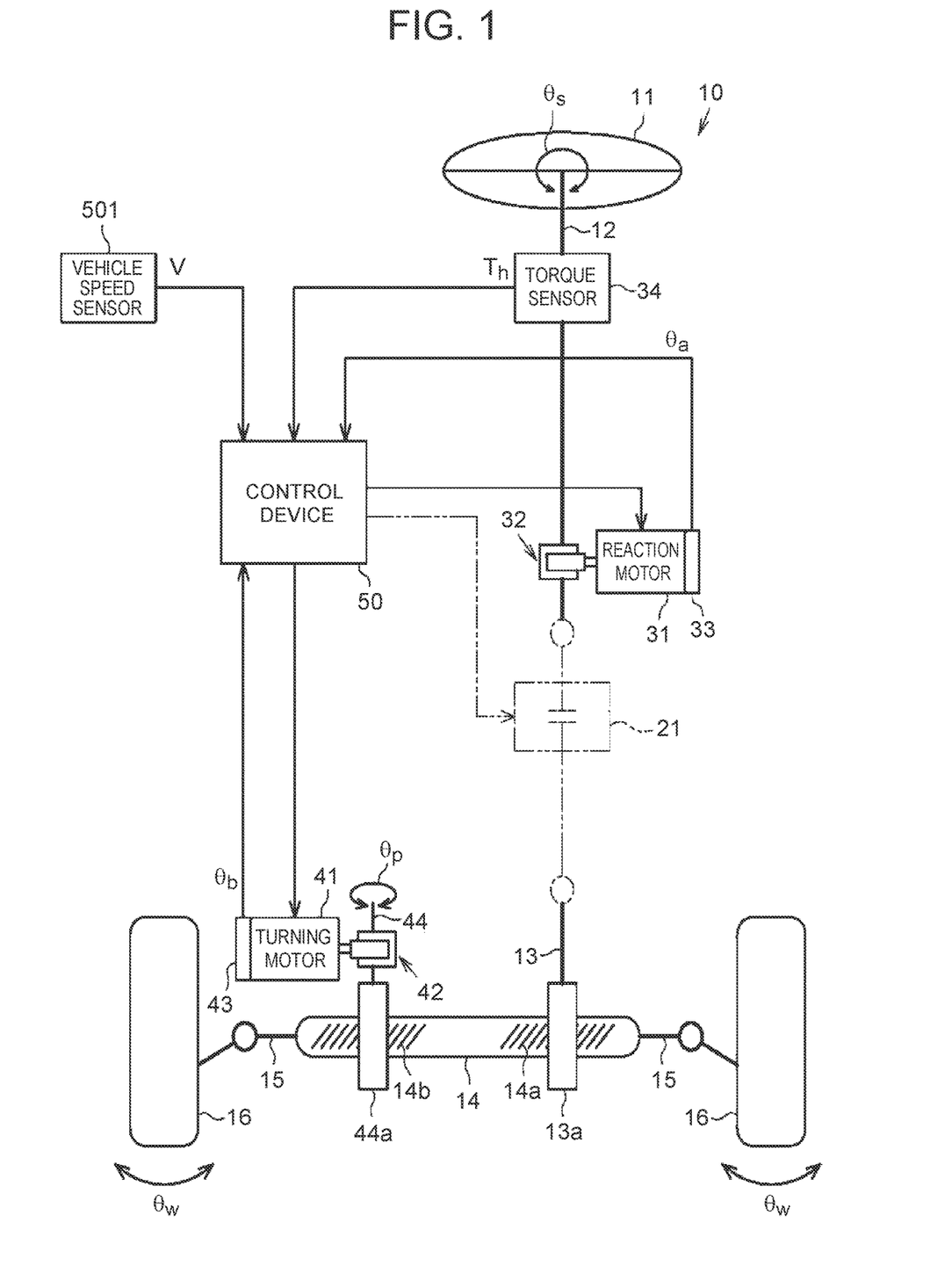
FIG. 1 is a configuration diagram of a steer-by-wire type steering apparatus that is equipped with a first embodiment of a steering apparatus.

As shown in FIG. 1, a steering apparatus 10 of a vehicle includes a steering shaft 12 that is coupled to a steering wheel 11. The steering apparatus 10 includes a turning shaft 14 that extends along a vehicle width direction (a right-left direction in FIG. 1). Right and left turning wheels 16 are coupled to both ends of the turning shaft 14 through tie rods 15, respectively. Turning angles θw of the turning wheels 16 are changed by linear motion of the turning shaft 14. The steering shaft 12 and the turning shaft 14 constitute a steering mechanism.

Configuration for Generating Steering Reaction Force: Reaction Unit

The steering apparatus 10 includes a reaction motor 31 (an example of a second motor), a speed reducer 32, a rotation angle sensor 33 and a torque sensor 34, as a configuration for generating a steering reaction force. Incidentally, the steering reaction force means a force (torque) that acts in an opposite direction of a direction of driver's operation of the steering wheel 11. By giving the steering reaction force to the steering wheel 11, it is possible to give a moderate sensation in driver's hands.

The reaction motor 31 is a generation source of the steering reaction force. As the reaction motor 31, for example, a brushless motor having three phases (U, V and W) is employed. The reaction motor 31 (a rotation shaft of the reaction motor 31, to be exact) is coupled to the steering shaft 12 through the speed reducer 32. The torque of the reaction motor 31 is given to the steering shaft 12 as the steering reaction force.

The rotation angle sensor 33 is provided on the reaction motor 31. The rotation angle sensor 33 detects a rotation angle θa of the reaction motor 31. The rotation angle θa of the reaction motor 31 is used for the computation of a steering angle θs. The reaction motor 31 and the steering shaft 12 interlock with each other through the speed reducer 32. Therefore, the rotation angle θa of the reaction motor 31 has a correlation with the rotation angle of the steering shaft 12 and furthermore the steering angle θs that is the rotation angle of the steering wheel 11. Accordingly, it is possible to evaluate the steering angle θs based on the rotation angle θa of the reaction motor 31.

The torque sensor 34 detects a steering torque Th that is applied to the steering shaft 12 by a rotation operation of the steering wheel 11. The torque sensor 34 is provided at a portion that is on the steering shaft 12 and that is closer to the steering wheel 11 than the speed reducer 32 is.

Configuration for Generating Turning Force: Turning Unit

The steering apparatus 10 includes a turning motor 41 (an example of a first motor), a speed reducer 42 and a rotation angle sensor 43, as a configuration for generating a turning force that is a dynamic force for turning the turning wheels 16.

The turning motor 41 is a generation source of the turning force. As the turning motor 41, for example, a brushless motor having three phases is employed. The turning motor 41 (a rotation shaft of the turning motor 41, to be exact) is coupled to a pinion shaft 44 through the speed reducer 42. A pinion gear 44a of the pinion shaft 44 engages with a rack gear 14b of the turning shaft 14. The torque of the turning motor 41 is given to the turning shaft 14 through the pinion shaft 44, as the turning force. In response to the rotation of the turning motor 41, the turning shaft 14 moves along the vehicle width direction (the right-left direction in the figure).

The rotation angle sensor 43 is provided on the turning motor 41. The rotation angle sensor 43 detects a rotation angle θb of the turning motor 41. Incidentally, the steering apparatus 10 includes a pinion shaft 13. The pinion shaft 13 is provided so as to cross the turning shaft 14. A pinion gear 13a of the pinion shaft 13 engages with a rack gear 14a of the turning shaft 14. The reason why the pinion shaft 13 is provided is that the pinion shaft 13 supports the turning shaft 14 within a housing (not illustrated) together with the pinion shaft 44. That is, by a support mechanism (not illustrated) provided in the steering apparatus 10, the turning shaft 14 is supported such that the turning shaft 14 can move along an axial direction of the turning shaft 14, and is pressed toward the pinion shafts 13, 44. Thereby, the turning shaft 14 is supported within the housing. However, the steering apparatus 10 may be provided with another support mechanism that supports the turning shaft 14 within the housing without using the pinion shaft 13.

Control Device

The steering apparatus 10 includes a control device 50. The control device 50 controls the reaction motor 31 and the turning motor 41, based on detection results of various sensors. As the sensors, there is a vehicle speed sensor 501, in addition to the above-described rotation angle sensor 33, torque sensor 34 and rotation angle sensor 43. The vehicle speed sensor 501, which is provided in the vehicle, detects a vehicle speed V that is the traveling speed of the vehicle.

The control device 50 executes a reaction force control to generate the steering reaction force corresponding to the steering torque Th, through a drive control of the reaction motor 31. The control device 50 computes a target steering reaction force based on the steering torque Th and the vehicle speed V, and computes a target steering angle of the steering wheel 11 based on the computed target steering reaction force, the steering torque Th and the vehicle speed V. The control device 50 computes a steering angle correction amount through a feedback control of the steering angle θs that is executed such that the actual steering angle θs follows up the target steering angle, and computes a steering reaction force command value by adding the computed steering angle correction amount to the target steering reaction force. The control device 50 supplies an electric current necessary to generate the steering reaction force corresponding to the steering reaction force command value, to the reaction motor 31.

The control device 50 executes a turning control to turn the turning wheels 16 depending on a steering state, through a drive control of the turning motor 41. The control device 50 computes a pinion angle θp that is the actual rotation angle of the pinion shaft 44, based on the rotation angle θb of the turning motor 41 that is detected through the rotation angle sensor 43. The pinion angle θp is a value that reflects the turning angle θw of the turning wheels 16. The control device 50 computes a target pinion angle, using the above-described target steering angle. Then, the control device 50 evaluates the deviation between the target pinion angle and the actual pinion angle θp, and controls an electricity supply for the turning motor 41 such that the deviation is eliminated.

Detailed Configuration of Control Device

Figure 2:
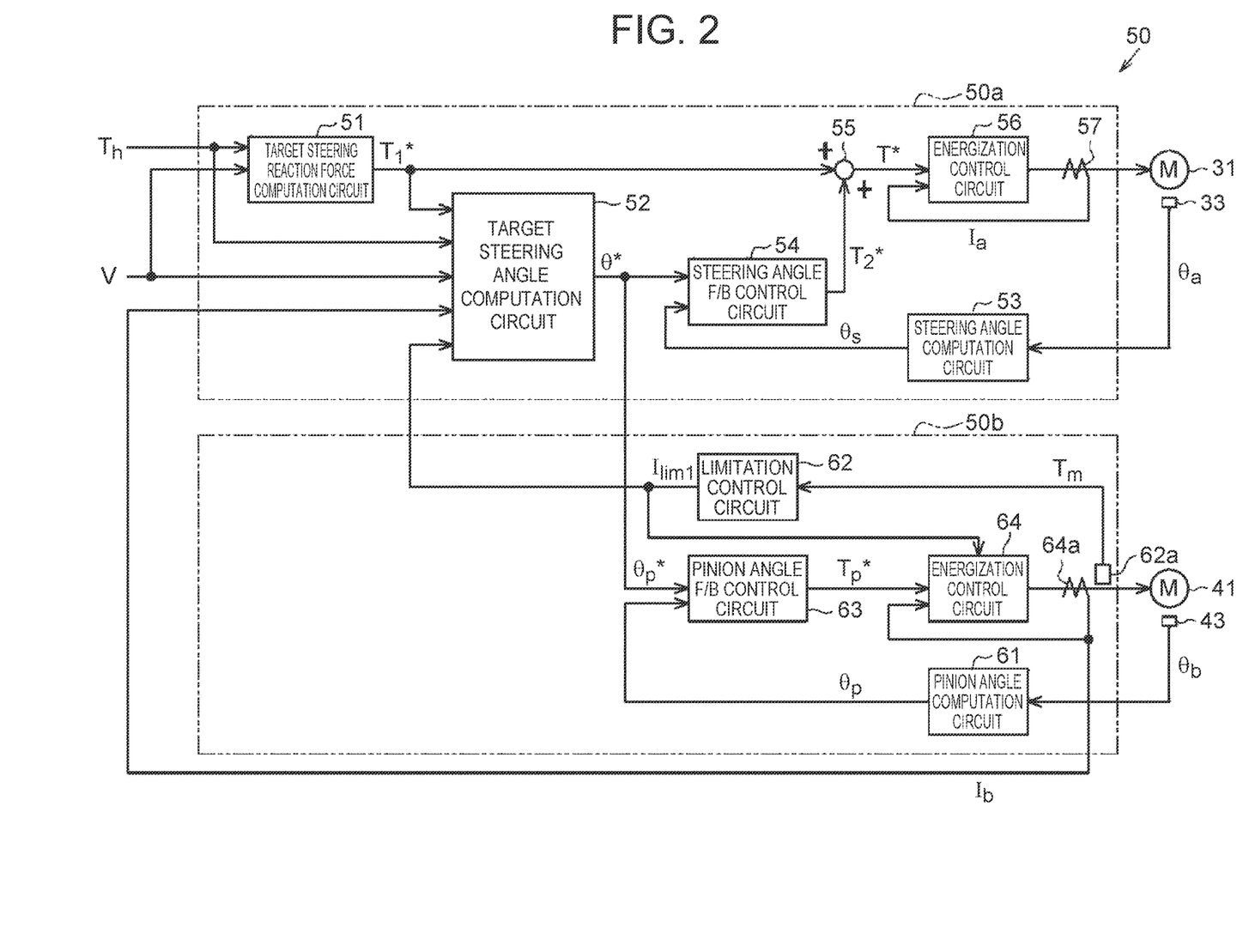
FIG. 2 is a control block diagram of the control device in the first embodiment.

Next, the control device 50 will be described in detail. As shown in FIG. 2, the control device 50 includes a reaction force control circuit 50*a* that executes the reaction force control, and a turning control circuit 50*b* that executes the turning control.

Reaction Force Control Circuit

The reaction force control circuit 50*a* includes a target steering reaction force computation circuit 51, a target steering angle computation circuit 52, a steering angle computation circuit 53, a steering angle feedback control circuit 54, an adder 55 and an energization control circuit 56.

The target steering reaction force computation circuit 51 computes a target steering reaction force T1*, based on the steering torque Th and the vehicle speed V. The target steering reaction force computation circuit 51 computes the target steering reaction force T1*, such that the value (absolute value) of the target steering reaction force T1* is larger as the absolute value of the steering torque Th is larger and the vehicle speed V is lower.

The target steering angle computation circuit 52 computes a target steering angle $\theta^*$ of the steering wheel 11, using the target steering reaction force T1*, the steering torque Th and the vehicle speed V. When the total of the target steering reaction force T1* and the steering torque Th is referred to as an input torque, the target steering angle computation circuit 52 has an ideal model that decides an idealized steering angle based on the input torque. In the ideal model, the steering angle corresponding to an ideal turning angle depending on the input torque is previously modeled by an experiment or the like, on the premise of a steering apparatus in which the steering wheel 11 and the turning wheels 16 are mechanically coupled. The target steering angle computation circuit 52 evaluates the input torque by adding the target steering reaction force T1* and the steering torque Th, and computes the target steering angle $\theta^*$ from the input torque, based on the ideal model.

The steering angle computation circuit 53 computes the actual steering angle $\theta s$ of the steering wheel 11, based on the rotation angle $\theta a$ of the reaction motor 31 that is detected through the rotation angle sensor 33. The steering angle feedback control circuit 54 computes a steering angle correction amount T2*, through the feedback control of the steering angle $\theta s$ for causing the actual steering angle $\theta s$ to follow up the target steering angle $\theta^*$. The adder 55 calculates the steering reaction force command value T*, by adding the steering angle correction amount T2* to the target steering reaction force T1*.

The energization control circuit 56 supplies an electric power corresponding to the steering reaction force command value T*, to the reaction motor 31. Specifically, the energization control circuit 56 computes a current command value for the reaction motor 31, based on the steering reaction force command value T*. Further, the energization control circuit 56 detects an actual current value Ia that is generated in an electricity supply path to the reaction motor 31, through a current sensor 57 provided on the electricity supply path. The current value Ia is the actual value of the electric current that is supplied to the reaction motor 31. Then, the energization control circuit 56 evaluates the deviation between the current command value and the actual current value Ia, and controls an electricity supply for the reaction motor 31 such that the deviation is eliminated (a feedback control of the current value Ia). Thereby, the reaction motor 31 generates the torque corresponding to the steering reaction force command value T*. It is possible to give a moderate sensation in driver's hands that corresponds to the reaction force of a road surface.

Turning Control Circuit

As shown in FIG. 2, the turning control circuit 50*b* includes a pinion angle computation circuit 61, a limitation control circuit 62, a pinion angle feedback control circuit 63 and an energization control circuit 64.

The pinion angle computation circuit 61 computes the pinion angle $\theta p$ that is the actual rotation angle of the pinion shaft 44, based on the rotation angle $\theta b$ of the turning motor 41 that is detected through the rotation angle sensor 43. As described above, the turning motor 41 and the pinion shaft 44 interlock with each other through the speed reducer 42. Therefore, there is a correlation between the rotation angle $\theta b$ of the turning motor 41 and the pinion angle $\theta p$. By using this correlation, it is possible to evaluate the pinion angle $\theta p$ from the rotation angle $\theta b$ of the turning motor 41. Furthermore, as described above, the pinion shaft 44 engages with the turning shaft 14. Therefore, there is a correlation between the pinion angle $\theta p$ and the moving amount of the turning shaft 14. That is, the pinion angle $\theta p$ is a value that reflects the turning angle $\theta w$ of the turning wheels 16.

The limitation control circuit 62 computes a limiting value Ilim1 to which the current amount to be supplied to the turning motor 41 is limited, for example, based on a heat generation state of the turning motor 41. The limiting value Ilim1 is set as an upper limit of the current amount to be supplied to the turning motor 41, from a standpoint of protection of the turning motor 41 from overheating. The limitation control circuit 62 computes the limiting value Ilim1 based on a result of comparison between a temperature Tm (estimated temperature) of the turning motor 41 that is detected through a temperature sensor 62*a* provided near an electricity supply path to the turning motor 41 and a temperature threshold. When the temperature Tm of the turning motor 41 is not exceeding the temperature threshold, the limitation control circuit 62 sets such a large absolute value that the electric current to be supplied to the turning motor 41 by the energization control circuit 64 is not limited, based on a maximal current value that the turning motor 41 is able to apply without overheating. On the other hand, when the temperature Tm of the turning motor 41 is exceeding the temperature threshold, the limitation control circuit 62 computes the limiting value Ilim1 having an absolute value smaller than the maximal current value that the turning motor 41 is able to apply without overheating. The limitation control circuit 62 computes the limitation value Ilim1 having a smaller absolute value as the temperature Tm of the turning motor 41 is higher.

The pinion angle feedback control circuit 63 takes in the target steering angle $\theta^*$ computed by the target steering angle computation circuit 52, as a target pinion angle $\theta p^*$. Further, the pinion angle feedback control circuit 63 takes in the actual pinion angle $\theta p$ computed by the pinion angle computation circuit 61. The pinion angle feedback control circuit 63 computes a pinion angle command value Tp*, through a feedback control (PID control) of the pinion angle $\theta p$ for causing the actual pinion angle $\theta p$ to follow up the target pinion angle $\theta p^*$ (which is equal to the target steering angle $\theta^*$ in the embodiment).

The energization control circuit 64 supplies an electric power corresponding to the pinion angle command value Tp*, to the turning motor 41. Specifically, the energization control circuit 64 computes a current command value for the turning motor 41, based on the pinion angle command value Tp*. Further, the energization control circuit 64 detects an actual current value Ib that is generated in an electricity supply path to the turning motor 41, through a current sensor 64*a* provided on the electricity supply path. The current value Ib is the actual value of the electric current that is supplied to the turning motor 41. Then, the energization control circuit 64 evaluates the deviation between the current command value and the actual current value Ib, and controls the electricity supply for the turning motor 41 such that the deviation is eliminated (a feedback of the current value Ib). Thereby, the turning motor 41 rotates by an angle corresponding to the pinion angle command value Tp*.

Target Steering Angle Computation Circuit

Figure 3:
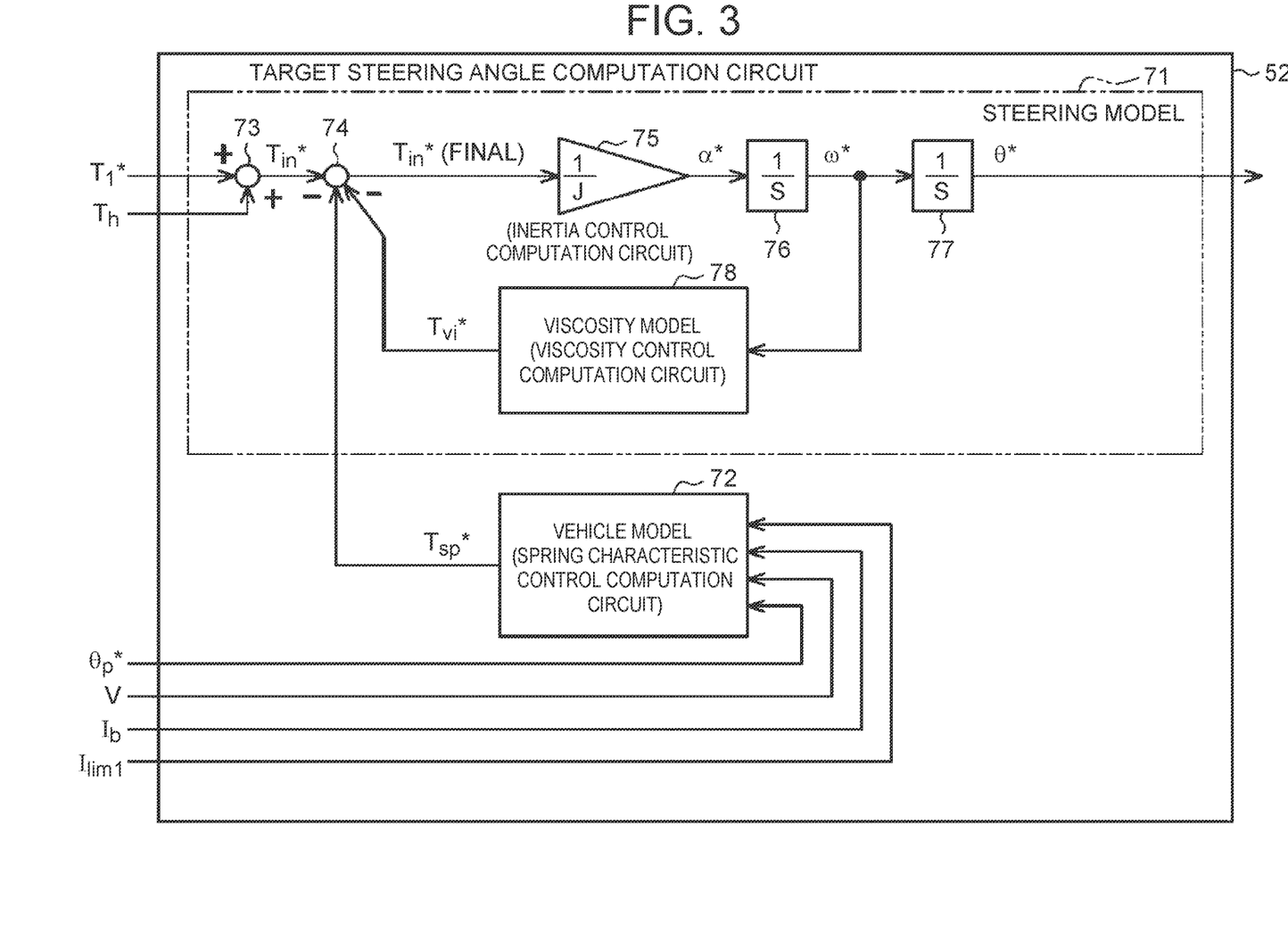
FIG. 3 is a control block diagram of a target steering angle computation circuit in the first embodiment.

Next, the target steering angle computation circuit 52 will be described in detail. As described above, based on the ideal model, the target steering angle computation circuit 52 computes the target steering angle θ* from the input torque that is the total of the target steering reaction force T1* and the steering torque Th. The ideal model is a model that uses the following Expression (1) expressing an input torque Tin* that is the torque to be applied to the steering shaft 12.

$$Tin^* = J\theta^{*\prime\prime} + C\theta^{*\prime} + K\theta^* \qquad (1)$$

where "J" is an inertia moment of the steering wheel 11 and the steering shaft 12, "C" is a viscosity coefficient (friction coefficient) corresponding to the friction and the like between the turning shaft 14 and the housing, and "K" is a spring modulus when each of the steering wheel 11 and the steering shaft 12 is regarded as a spring.

As can be seen from Expression (1), the input torque Tin* is obtained by adding a value resulting from multiplying a second-order temporal differentiation value $\theta^{*\prime\prime}$ of the target steering angle θ* by the inertia moment J, a value resulting from multiplying a first-order temporal differentiation value $\theta^{*\prime}$ of the target steering angle θ* by the viscosity coefficient C, and a value resulting from multiplying the target steering angle θ* by the spring modulus K. The target steering angle computation circuit 52 computes the target steering angle θ* in accordance with the ideal model based on Expression (1).

As shown in FIG. 3, the ideal model based on Expression (1) is divided into a steering model 71 and a vehicle model 72. The steering model 71 is tuned based on characteristics of constituent elements of the steering apparatus 10, as exemplified by characteristics of the steering shaft 12 and the reaction motor 31. The steering model 71 includes an adder 73, a subtractor 74, an inertia model 75, a first integrator 76, a second integrator 77 and a viscosity model 78.

The adder 73 computes the input torque Tin* by adding the target steering reaction force T1* and the steering torque Th. The subtractor 74 computes a final input torque Tin* by subtracting each of a viscosity component Tvi* and a spring component Tsp*, which will be described later, from the input torque Tin* calculated by the adder 73.

The inertia model 75 functions as an inertia control computation circuit corresponding to the inertia term of Expression (1). The inertia model 75 computes a steering angle acceleration α*, by multiplying the final input torque Tin* calculated by the subtractor 74, by the reciprocal of the inertia moment J.

The first integrator 76 computes a steering angle speed ω* by integrating the steering angle acceleration α* calculated by the inertia model 75. The second integrator 77 computes the target steering angle θ* by further integrating the steering angle speed ω* calculated by the first integrator 76. The target steering angle θ* is an idealized rotation angle of the steering wheel 11 (steering shaft 12) based on the steering model 71.

The viscosity model 78 functions as a viscosity control computation circuit corresponding to the viscosity term of Expression (1). The viscosity model 78 computes the viscosity component Tvi* of the input torque Tin*, by multiplying the steering angle speed ω* calculated by the first integrator 76, by the viscosity coefficient C.

The vehicle model 72 is tuned based on characteristics of the vehicle equipped with the steering apparatus 10. Characteristics of the vehicle that affect steering characteristics are decided, for example, by specifications of a suspension and a wheel alignment, a grip force (frictional force) of the turning wheels 16, and the like. The vehicle model 72 functions as a spring characteristic control computation circuit corresponding to the spring term of Expression (1). The vehicle model 72 computes the spring component Tsp* (torque) of the input torque Tin*, by multiplying the target steering angle θ* calculated by the second integrator 77, by the spring modulus K.

With the target steering angle computation circuit 52 configured in this way, it is possible to directly tune the relation between the input torque Tin* and the target steering angle θ* and further realize a desired steering characteristic, by adjusting the inertia moment J and viscosity coefficient C of the steering model 71 and the spring modulus K of the vehicle model 72.

Further, the target steering angle θ* computed from the input torque Tin* based on the steering model 71 and the vehicle model 72 is used as the target pinion angle θp*. Then, the feedback control is performed such that the actual pinion angle θp coincides with the target pinion angle θp*. As described above, there is a correlation between the pinion angle θp and the turning angle θw of the turning wheels 16. Therefore, the turning action of the turning wheels 16 that corresponds to the input torque Tin* is also decided by the steering model 71 and the vehicle model 72. That is, a steering feeling for the vehicle is decided by the steering model 71 and the vehicle model 72. Accordingly, it is possible to realize a desired steering feeling by adjusting the steering model 71 and the vehicle model 72.

However, in the control device 50 configured in this way, the steering reaction force (the sensation in hands that is obtained by steering) depends only on the target steering angle θ*. That is, the steering reaction force is not changed by a vehicle behavior or a road surface state (slipperiness of a road surface, or the like). Therefore, it is hard for the driver to grasp the vehicle behavior or the road surface state from the steering reaction force. Hence, in the embodiment, from a standpoint of resolution of the concern, the vehicle model 72 is configured as follows.

Vehicle Model

Figure 4:
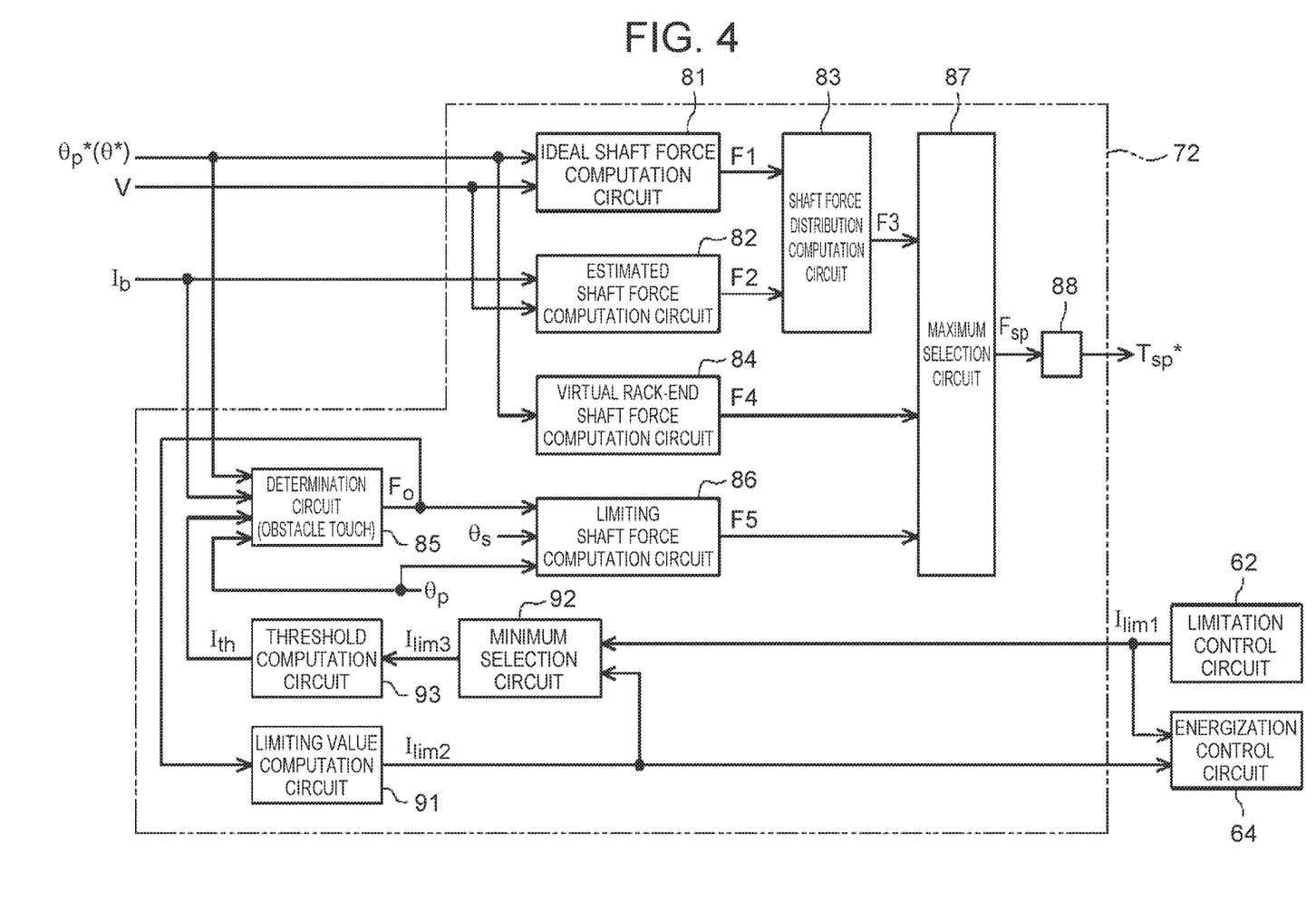
FIG. 4 is a control block diagram of a vehicle model in the first embodiment.

As shown in FIG. 4, the vehicle model 72 includes an ideal shaft force computation circuit 81, an estimated shaft force computation circuit 82, a shaft force distribution computation circuit 83, a virtual rack-end shaft force computation circuit 84, a determination circuit 85, a limiting shaft force computation circuit 86, a maximum selection circuit 87 and a conversion circuit 88.

The ideal shaft force computation circuit 81 computes an ideal shaft force F1 that is an ideal value of the shaft force that acts on the turning shaft 14 through the turning wheels 16, based on the target pinion angle θp*. The ideal shaft force computation circuit 81 computes an ideal shaft force F1, using an ideal shaft force map stored in a storage device of the control device 50. The ideal shaft force map is a map in which the abscissa axis indicates the target pinion angle θp* and the ordinate axis indicates the ideal shaft force F1, and specifies a relation between the target pinion angle θp* and the ideal shaft force F1, based on the vehicle speed V. The ideal shaft force map has the following characteristics. That is, the absolute value of the ideal shaft force F1 is set to a larger value, as the absolute value of the target pinion angle θp* is larger and the vehicle speed V is lower. The absolute value of the ideal shaft force F1 linearly increases with increase in the absolute value of the target pinion angle θp*. The ideal shaft force F1 is set so as to have the same sign as the sign (positive or negative sign) of the target pinion angle θp*.

The estimated shaft force computation circuit 82 computes an estimated shaft force F2 (road surface reaction force) that acts on the turning shaft 14, based on the current value Ib of the turning motor 41. Here, a disturbance corresponding to the road surface state (the frictional resistance of the road surface) acts on the turning wheels 16, and thereby a difference is generated between the target pinion angle θp* and the actual pinion angle θp is generated, so that the current value Ib of the turning motor 41 changes. That is, the current value Ib of the turning motor 41 reflects the actual road surface reaction force that acts on the turning wheels 16. Therefore, it is possible to compute the shaft force that reflects the influence of the road surface state, based on the current value Ib of the turning motor 41. The estimated shaft force F2 is evaluated by multiplying the current value Ib of the turning motor 41 by a gain that is a coefficient depending on the vehicle speed V.

The shaft force distribution computation circuit 83 computes a mixed shaft force F3, by adding up values resulting from multiplying the ideal shaft force F1 and the estimated shaft force F2 by individually set distribution ratios (gains) respectively. The distribution ratio is set depending on various state amounts that reflect the vehicle behavior, the road surface state or the steering state. The distribution ratio may be set based on only the vehicle speed V that is one of the state amounts of the vehicle. In this case, for example, as the vehicle speed V is higher, the distribution ratio of the ideal shaft force F1 is set to a higher value and the distribution ratio of the estimated shaft force F2 is set to a lower value. Further, as the vehicle speed V is lower, the distribution ratio of the ideal shaft force F1 is set to a lower value and the distribution ratio of the estimated shaft force F2 is set to a higher value.

The virtual rack-end shaft force computation circuit 84 computes a virtual rack-end shaft force F4 for virtually limiting the operation range of the steering wheel 11, based on the target pinion angle θp* (target steering angle θ*) as the virtual rack-end shaft force. The virtual rack-end shaft force F4 is computed, such that the torque (steering reaction torque) that is generated by the reaction motor 31 and that is in an opposite direction of the steering direction is rapidly increased when the operation position of the steering wheel 11 is close to a limit position of an operation range of the steering wheel 11 or when the turning shaft 14 is close to a limit position of a physical movable range of the turning shaft 14. The limit position of the operation range of the steering wheel 11 is decided, for example, by the length of a spiral cable that is provided in the steering wheel 11. The limit position of the physical movable range of the turning shaft 14 is a position where the movement range of the turning shaft 14 is physically restricted due to a so-called "end touch", by which an end portion (rack end) of the turning shaft 14 abuts on an unillustrated housing.

The virtual rack-end shaft force computation circuit 84 computes the virtual rack-end shaft force F4, using a virtual rack-end map stored in the storage device of the control device 50. The virtual rack-end map is a map in which the abscissa axis indicates the target pinion angle θp* and the ordinate axis indicates the virtual rack-end shaft force F4, and specifies a relation between the target pinion angle θp* and the virtual rack-end shaft force F4. The virtual rack-end map has the following characteristics. That is, until the absolute value of the target pinion angle θp* reaches an end determination threshold on the basis of "0", the virtual rack-end shaft force F4 is maintained at "0", which is a neutral angle corresponding to a steering neutral position or a turning neutral position. After the absolute value of the target pinion angle θp* reaches the end determination threshold, the virtual rack-end shaft force F4 is generated, and the virtual rack-end shaft force F4 rapidly increases such that the absolute value of the virtual rack-end shaft force F4 increases.

Incidentally, the virtual rack-end shaft force F4 is set so as to have the same sign as the sign (positive or negative sign) of the target pinion angle θp*. Further, the end determination threshold is set based on a value close to the steering angle θs when the steering wheel 11 reaches the limit position of the operation range or a value close to the pinion angle θp when the turning shaft 14 reaches the limit position of the movable range.

The determination circuit 85 determines whether the turning wheels 16 are in touch with an obstacle such as a curbstone. When all of the following three determination conditions (A1), (A2) and (A3) are satisfied, the determination circuit 85 determines that the turning wheels 16 are in touch with the obstacle such as a curbstone.

$$|\Delta\theta p(=|\theta p^* - \theta p|)| > \theta th \tag{A1}$$

$$|Ib| > Ith \tag{A2}$$

$$|\omega p| < \omega th \tag{A3}$$

In the determination condition (A1), "θp*" is the target pinion angle, and "θp" is the actual pinion angle. Further, "Δθp" is an angle deviation, and is obtained by subtracting the actual pinion angle θp from the target pinion angle θp*. Further, "θth" is an angle deviation threshold. The angle deviation threshold θth is set from the following standpoint. That is, in the case where the turning wheels 16 are in touch with the obstacle, it is difficult to turn the turning wheels 16 to a side on which the turning wheels 16 are in touch with the obstacle. When the steering wheel 11 is steered to the side on which the turning wheels 16 are in touch with the obstacle in this state, the target steering angle θ* and further the target pinion angle θp* increases in response to the steering, but the turning angle θw and further the pinion angle θp are maintained at constant values. Therefore, when the turning wheels 16 attempt to be further turned in the situation where the turning wheels 16 are in touch with the obstacle, the deviation between the target steering angle θ* and the target pinion angle θp* increases. Therefore, it can be said that there is a higher probability that the turning wheels 16 are in touch with the obstacle as the absolute value of the angle deviation Δθp is larger. Accordingly, the angle deviation Δθp is a value indicating the degree of likelihood of the situation where the turning wheels 16 are in touch with the obstacle. From this standpoint, the angle deviation threshold θth is set by an experiment or a simulation, in consideration of tolerance due to noise of the rotation angle sensor 43 and the like.

In the determination condition (A2), "Ib" is the current value Ib of the turning motor 41, and "Ith" is the current threshold. The current threshold Ith is set from the following standpoint. That is, when the turning wheels 16 attempt to be further turned in the situation where the turning wheels 16 are in touch with the obstacle, the absolute value of the current value Ib of the turning motor 41 increases. Therefore, it can be said that there is a higher probability that the turning wheels 16 are in touch with the obstacle as the absolute value of the current value Ib of the turning motor 41 is larger. Accordingly, the current value Ib of the turning motor 41 is also a value indicating the degree of likelihood of the situation where the turning wheels 16 are in touch with the obstacle. From this standpoint, the current threshold Ith is set by an experiment or a simulation.

In the determination condition (A3), "ωp" is the pinion angle speed, and is obtained by differentiating the target pinion angle θp* or the pinion angle θp. Further, "ωth" is an angle speed threshold. The angle speed threshold ωth is set from the following standpoint. That is, in the situation where the turning wheels 16 are in touch with the obstacle, it is difficult to turn the turning wheels 16. Therefore, it can be said that there is a higher probability that the turning wheels 16 are in touch with the obstacle as the absolute value of the turning speed of the turning wheels 16 and further the absolute value of the pinion angle speed ωp are smaller. Accordingly, the pinion angle speed ωp is also a value indicating the degree of likelihood of the situation where the turning wheels 16 are in touch with the obstacle. From this standpoint, the angle speed threshold ωth is set by an experiment or a simulation, in consideration of tolerance due to noise of the rotation angle sensor 43 and the like.

The determination circuit 85 sets the value of a flag Fo based on a determination result of whether the turning wheels 16 are in touch with the obstacle. When it is determined that the turning wheels 16 are not in touch with the obstacle, that is, when at least one of the three determination conditions (A1) to (A3) is not satisfied, the determination circuit 85 sets the value of the flag Fo to "0". When it is determined that the turning wheels 16 are in touch with the obstacle, that is, when all of the three determination conditions (A1) to (A3) are satisfied, the determination circuit 85 sets the value of the flag Fo to "1".

The limiting shaft force computation circuit 86 computes a limiting shaft force F5 for limiting a further steering to the side of the touch with the obstacle in the situation where the turning wheels 16 are in touch with the obstacle. The limiting shaft force computation circuit 86 recognizes whether the computation of the limiting shaft force F5 is necessary, based on the determination result of the determination circuit 85, that is, the value of the flag Fo. When the value of the flag Fo is "0", the limiting shaft force computation circuit 86 does not compute the limiting shaft force F5. When the value of the flag Fo is "1", the limiting shaft force computation circuit 86 computes the limiting shaft force F5.

The limiting shaft force computation circuit 86 computes the limiting shaft force F5 based on the steering angle θs computed by the steering angle computation circuit 53 and the pinion angle θp computed by the pinion angle computation circuit 61. In the computation of the limiting shaft force F5, the limiting shaft force computation circuit 86 computes the difference (angle deviation) between the steering angle θs and the pinion angle θp, by subtracting the pinion angle θp from the steering angle θs. The limiting shaft force computation circuit 86 computes the limiting shaft force F5, using a limiting shaft force map stored in the storage device of the control device 50. The limiting shaft force map is a map in which the abscissa axis indicates the absolute value of the difference between the steering angle θs and the pinion angle θp and the ordinate axis indicates the limiting shaft force F5, and specifies a relation of the difference between the steering angle θs and the pinion angle θp and the limiting shaft force F5.

For example, the limiting shaft force map has the following characteristics. That is, in the case where the absolute value of the difference between the steering angle θs and the pinion angle θp is a value in a range from "0" to a difference threshold, the limiting shaft force F5 slowly increase with increase in the absolute value of the difference between the steering angle θs and the pinion angle θp. After the absolute value of the difference between the steering angle θs and the pinion angle θp reaches the difference threshold, the limiting shaft force F5 rapidly increases with increase in the absolute value of the difference between the steering angle θs and the pinion angle θp.

Incidentally, the difference threshold is a value allowing the determination that the turning wheels 16 are in touch with the obstacle, and is set by an experiment or a simulation. After the absolute value of the difference between the steering angle θs and the pinion angle θp reaches the difference threshold, the limiting shaft force F5 is set from a standpoint of generation of a steering reaction force that makes it difficult for the driver to turn the steering wheel 11.

The limiting shaft force computation circuit 86 may compute the limiting shaft force F5, in consideration of the current value Ib of the turning motor 41 and the pinion angle speed ωp, in addition to the difference between the steering angle θs and the pinion angle θp. That is, the limiting shaft force computation circuit 86 comprehensively considers the degree of the likelihood of the situation where the turning wheels 16 are in touch with the obstacle, based on the difference between the steering angle θs and the pinion angle θp, the current value Ib of the turning motor 41, and the pinion angle speed ωp, and computes the limiting shaft force F5 depending on the degree of the likelihood.

Further, the limiting shaft force computation circuit 86 may compute the limiting shaft force F5 based on the difference between the target steering angle θ* and the pinion angle θp or target pinion angle θp*, instead of the difference between the steering angle θs and the pinion angle θp. The difference between the target steering angle θ* and the pinion angle θp or target pinion angle θp* is also a value indicating the degree of the likelihood of the situation where the turning wheels 16 are in touch with the obstacle. Further, the limiting shaft force computation circuit 86 may compute the limiting shaft force F5, based on the difference between the target steering angle θ* and a turning angle that is obtained by multiplying the pinion angle θp by a predetermined conversion factor, instead of the difference between the steering angle θs and the pinion angle θp.

The maximum selection circuit 87 takes in the mixed shaft force F3 computed by the shaft force distribution computation circuit 83, the virtual rack-end shaft force F4 computed by the virtual rack-end shaft force computation circuit 84, and the limiting shaft force F5 computed by the limiting shaft force computation circuit 86. The maximum selection circuit 87 selects a shaft force having the largest absolute value, from the taken mixed shaft force F3, virtual rack-end shaft force F4 and limiting shaft force F5, and sets the selected mixed shaft force F3, virtual rack-end shaft force F4 or limiting shaft force F5, as a final shaft force Fsp that is used for the computation of the spring component Tsp* of the input torque Tin*.

The conversion circuit 88 computes (converts) the spring component Tsp* of the input torque Tin*, based on the final shaft force Fsp set by the maximum selection circuit 87. In the case where the mixed shaft force F3 is set as the final shaft force Fsp by the maximum selection circuit 87, the spring component Tsp* based on the final shaft force Fsp is reflected in the input torque Tin*, and thereby it is possible to give the steering reaction force corresponding to the vehicle behavior or the road surface state, to the steering wheel 11. The driver feels the steering reaction force through the steering wheel 11 as a sensation in driver's hands, and thereby can grasp the vehicle behavior or the road surface state.

In the case where the virtual rack-end shaft force F4 is set as the final shaft force Fsp by the maximum selection circuit 87, the spring component Tsp* based on the final shaft force Fsp is reflected in the input torque Tin*, and thereby the steering reaction force rapidly increases. Therefore, it is difficult for the driver to operate the steering wheel 11 in a direction of increase in the absolute value of the steering angle θs. Accordingly, the driver has a feeling of contact as the steering reaction force (a sensation in driver's hands), and thereby can recognize that the steering wheel 11 has reached the limit position of the virtual operation range.

In the case where the limiting shaft force F5 is set as the final shaft force Fsp by the maximum selection circuit 87, the spring component Tsp* based on the final shaft force Fsp is reflected in the input torque Tin*, and thereby the steering reaction force rapidly increases. Therefore, it is difficult for the driver to operate the steering wheel 11 to the side of the touch with the obstacle. Accordingly, the driver has a feeling of contact as the steering reaction force, and thereby can recognize the situation where the turning wheels 16 are in touch with the obstacle such as a curbstone.

In this way, through the control of the reaction motor 31 and the turning motor 41 by the control device 50, it is possible to notify the driver of the vehicle behavior, the road surface state, the steering state of the steering wheel 11, or the turning state of the turning wheels 16, with the steering reaction force through the steering wheel 11. However, in the control by the control device 50, there is the following concern.

That is, the control device 50 employs the current value Ib of the turning motor 41, as one of the determination conditions of whether the turning wheels 16 are in touch with the obstacle such as a curbstone. Further, the control device 50 has a current limitation function to limit the current amount to be supplied to the turning motor 41 depending on the heat generation state of the turning motor 41. There is a fear that the current limitation function interferes with the determination of whether the turning wheels 16 are in touch with the obstacle.

For example, in the case where the turning wheels 16 are in touch with the obstacle such as a curbstone at the time of the stationary steering for the start of the vehicle, the current amount to be supplied to the turning motor 41 rapidly increases, and thereby the temperature of the turning motor 41 also rapidly rises. Therefore, before the current value Ib of the turning motor 41 reaches the current threshold Ith, the temperature of the turning motor 41 can get close to a temperature in the overheating state, and thereby the current amount to be supplied to the turning motor 41 can be limited. Therefore, there is a concern that it is not determined that the turning wheels 16 are in touch with the obstacle, even though the turning wheels 16 are actually in touch with the obstacle. In this case, the steering reaction force for notifying the driver of the situation where the turning wheels 16 are in touch with the obstacle is not generated.

Hence, the embodiment employs the following configuration as the vehicle model 72, for properly notifying the driver of the situation where the turning wheels 16 are in touch with the obstacle, with the steering reaction force through the steering wheel 11.

As shown in FIG. 4, the vehicle model includes a limiting value computation circuit 91, a minimum selection circuit 92 and a threshold computation circuit 93. The limiting value computation circuit 91 computes a limiting value Ilim2 to which the current amount to be supplied to the turning motor 41 is limited, based on the determination result of the determination circuit 85 about whether the turning wheels 16 are in touch with the obstacle, that is, based on the value of the flag Fo. Details are shown as follows.

Figure 5:
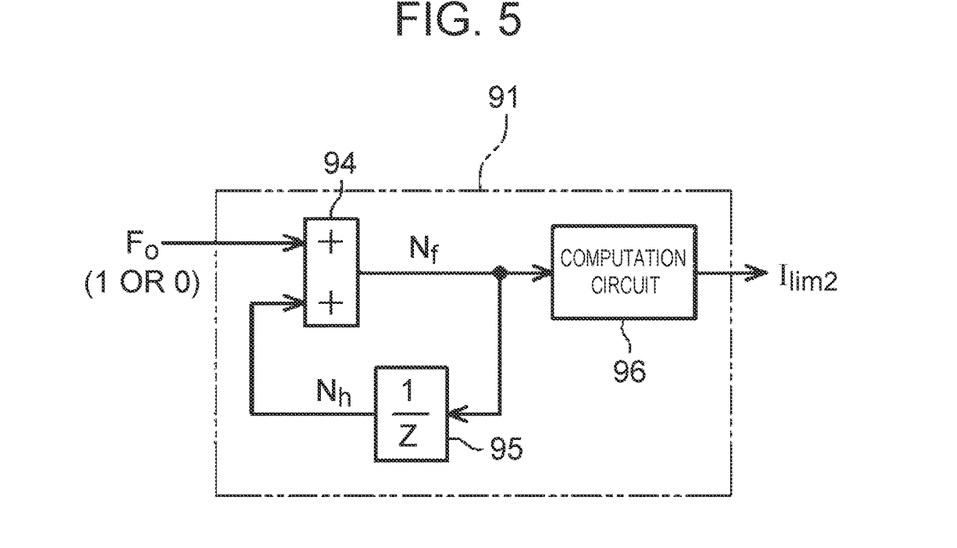
FIG. 5 is a control block diagram of a limiting value computation circuit in the first embodiment.

As shown in FIG. 5, the limiting value computation circuit 91 includes an adder 94, a holding circuit 95 and a computation circuit 96. The adder 94 takes in the value (1 or 0) of the flag Fo that is set by the determination circuit 85, and computes a count value Nf, by adding the taken value of the flag Fo and a value Nh held in the holding circuit 95 described later.

The holding circuit 95 takes in the count value Nf computed by the adder 94, and holds the taken count value Nf. The value Nh held in the holding circuit 95 is updated whenever the value of the flag Fo is taken in the adder 94 with a prescribed sampling period, that is, whenever the count value Nf is computed by the adder 94. That is, the value Nh held in the holding circuit 95 is a last-time value before the count value Nf as a current-time value that is computed by the adder 94, that is, the count value Nf in the previous computation period. Further, when the value of the flag Fo switches from "1" to "0", the holding circuit 95 resets the value Nh held in the holding circuit 95, to "0". In the case where the count value Nf taken from the adder 94 is the same as the last value, the holding circuit 95 recognizes that the value of the flag Fo is "0". Further, the holding circuit 95 may recognize that the value of the flag Fo is "0", by taking in the value of the flag Fo.

The computation circuit 96 computes the limiting value Ilim2 to which the current amount to be supplied to the turning motor 41 is limited, based on the count value Nf computed by the adder 94. Details are shown as follows.

Figure 6:
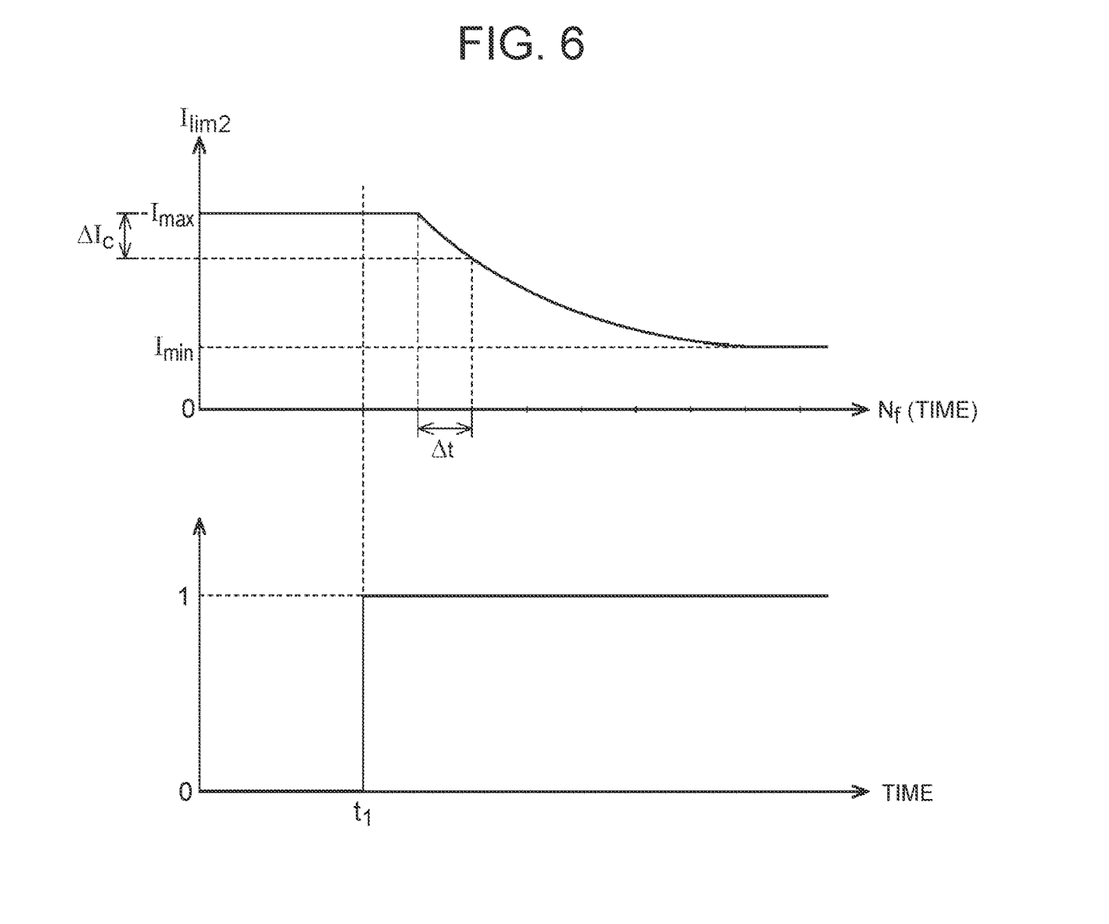

As shown in graphs of FIG. 6, at time t1, it is determined that the turning wheels 16 are in touch with the obstacle, and thereby the value of the flag Fo is set to "1". Thereafter, with increase in the count value Nf, the computation circuit 96 gradually decreases the limiting value Ilim2 from a maximal limiting value Imax to a minimal limiting value Imin. When the value of the flag Fo is maintained at "1" after time t1, the computation circuit 96 decreases the limiting value Ilim2 by a setting value ΔIc with a sampling period Δt.

Incidentally, the maximal limiting value Imax is set based on a maximal current value that the turning motor 41 is able to apply without overheating. The absolute value of the maximal limiting value Imax is set to such a large value that the electric current to be supplied to the turning motor 41 by the energization control circuit 64 is not limited. The minimal limiting value Imin is set based on a minimal current value that the turning motor 41 is able to apply without overheating. The absolute value of the minimal limiting value Imin is set to as small an absolute value as possible, such that the electric current to be supplied to the turning motor 41 by the energization control circuit 64 is limited to a degree at which the heat generation amount of the turning motor 41 is minimized in a realizable range.

The computation circuit 96 may switch the limiting value Ilim2 from the maximal limiting value Imax to the minimal limiting value Imin immediately after the value of the flag Fo switches from "0" to "1".

As shown in FIG. 4, the minimum selection circuit 92 takes in the limiting value Ilim1 computed by the limitation control circuit 62 and the limiting value Ilim2 computed by the limiting value computation circuit 91. The minimum selection circuit 92 selects a limiting value having the smaller absolute value, from the taken limiting values Ilim1, Ilim2, and sets the selected limiting value Ilim1 or limiting value Ilim2, as a final limiting value Ilim3 that is used for the computation of the current threshold Ith, which is a criterion for the determination of whether the turning wheels 16 are in touch with the obstacle.

Incidentally, the limiting value Ilim2 is supplied also to the energization control circuit 64 of the turning control circuit 50b. The energization control circuit 64 selects a limiting value having the smaller absolute value from the limiting values Ilim1, Ilim2, and limits the current amount to be supplied to the turning motor 41, using the selected limiting value Ilim1 or limiting value Ilim2. That is, the energization control circuit 64 compares the absolute value of the electric current to be supplied to the turning motor 41, to the limiting value Ilim1 or limiting value Ilim2 having the smaller absolute value of the absolute values of the limiting values Ilim1, Ilim2. When the absolute value of the electric current to be supplied to the turning motor 41 is larger than the limiting value that is one of the limiting values Ilim1, Ilim2 and that has the smaller absolute value, the energization control circuit 64 limits the absolute value of the electric current to be supplied to the turning motor 41, to the limiting value that is one of the limiting values Ilim1, Ilim2 and that has the smaller absolute value. When the absolute value of the electric current to be supplied to the turning motor 41 is equal to or smaller than the limiting value that is one of the limiting values Ilim1, Ilim2 and that has the smaller absolute value, the energization control circuit 64 supplies, to the turning motor 41, the original electric current computed through the feedback control of the current value Ib, with no change.

The threshold computation circuit 93 alters the current threshold Ith, which is a criterion for the determination of whether the turning wheels 16 are in touch with the obstacle, depending on the limiting value Ilim3 set by the minimum selection circuit 92. Details are shown as follows.

Figure 7:
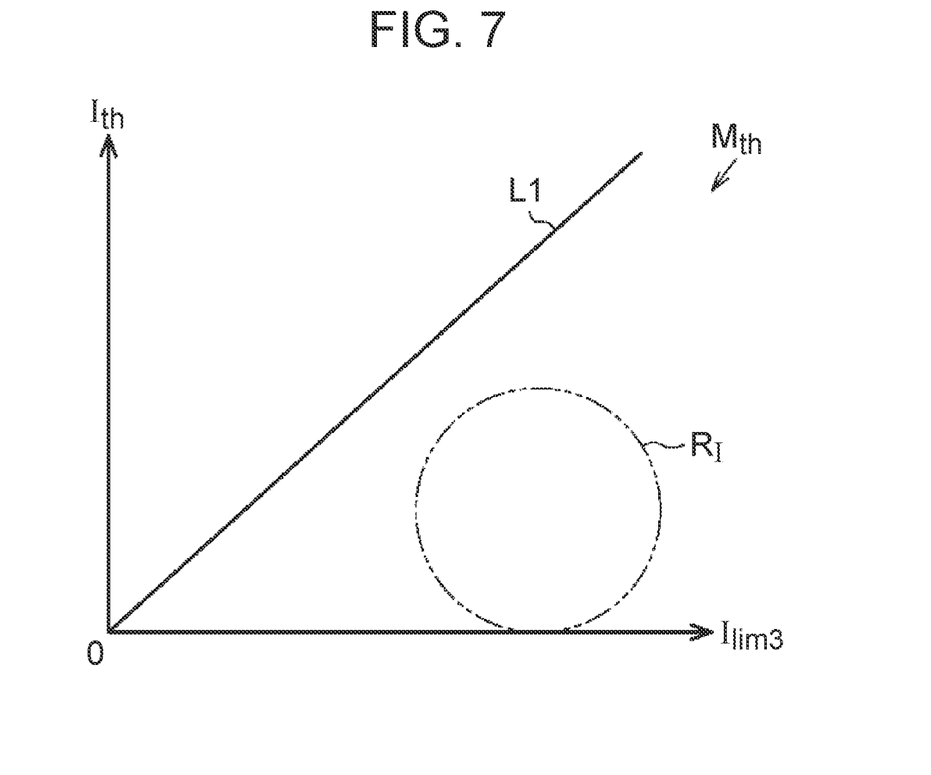
FIG. 7 is a graph showing a relation between a limiting current value for protection from overheating and a current threshold for a curbstone touch determination in the first embodiment.

As shown in a graph of FIG. 7, the threshold computation circuit 93 computes the current threshold Ith using a threshold map Mth. The threshold map Mth is a map in which the abscissa axis indicates the limiting value Ilim3 and the ordinate axis indicates the current threshold Ith, and specifies a relation between the limiting value Ilim3 and the current threshold Ith. The threshold map Mth has the following characteristics. That is, as shown by a characteristic line L1 in the graph of FIG. 7, the current threshold Ith linearly increases with increase in the limiting value Ilim3. The current threshold Ith is set to the same value as the limiting value Ilim3, by one-to-one correspondence. The current threshold Ith changes along a straight line with a slope of "1", with the change in the limiting value Ilim3.

Operations of First Embodiment

Next, operations of the control device when the turning wheels are in touch with the obstacle will be described. For example, in the case where the turning wheels 16 are in touch with the obstacle such as a curbstone at the time of the stationary steering for the start of the vehicle, the turning wheels 16 cannot be turned, so that the pinion angle θp of the pinion shaft 44 cannot follow up the target pinion angle θp*. Therefore, the current value Ib of the turning motor 41 increases depending on the difference between the pinion angle θp and the target pinion angle θp*, and the temperature of the turning motor 41 rises with the increase in the current value Ib.

When the temperature of the turning motor 41 that is detected through the temperature sensor 62a is exceeding the temperature threshold, the control device 50 computes the limiting value Ilim1 to which the electric current to be supplied to the turning motor 41 is limited. Further, when all of the above three determination conditions (A1), (A2), (A3) are satisfied, the control device 50 determines that the turning wheels 16 are in touch with the obstacle such as a curbstone. At this time, the control device 50 computes the limiting value Ilim2 to which the electric current to be supplied to the turning motor 41 is limited. The limiting value Ilim2 is gradually decreased from the maximal limiting value Imax to the minimal limiting value Imin, as time elapses.

Then, the control device 50 limits the current amount to be supplied to the turning motor 41, using the limiting value that is one of the limiting values Ilim1, Ilim2 and that has the smaller absolute value. Since the current value Ib of the turning motor 41 is limited at least to the minimal limiting value Imin, the rise in the temperature of the turning motor 41 is restrained. Moreover, with decrease in the current value Ib of the turning motor 41, the temperature of the turning motor 41 gradually decreases, and then reaches a temperature equal to or lower than the temperature threshold. Thereby, the turning motor 41 is protected from overheating.

Further, the control device 50 sets the limiting value that is one of the limiting values Ilim1, Ilim2 and that has the smaller absolute value, as the final limiting value Ilim3 that is used for the computation of the current threshold Ith, which is a criterion for the determination of whether the turning wheels 16 are in touch with the obstacle, and computes the current threshold Ith depending on the set limiting value Ilim3. In the embodiment, the current threshold Ith having the same value as the limiting value Ilim3 is computed. That is, the current threshold Ith is not set to a value larger than the current value Ib of the turning motor 41 that is limited to the limiting value (Ilim1 or Ilim2) having the smallest absolute value.

Therefore, even when the limiting value Ilim1 for protection from overheating is computed, the current value Ib of the turning motor 41 reaches the current threshold Ith. Accordingly, the control device 50 can properly determine that the turning wheels 16 are in touch with the obstacle. Further, the control device 50 can properly generate the steering reaction force for notifying the driver of the situation where the turning wheels 16 are in touch with the obstacle.

When the contact of the turning wheels 16 with the obstacle is canceled after that and at least one of the above three determination conditions (A1), (A2), (A3) is not satisfied, the limiting value Ilim2 for protection from the obstacle is immediately restored from the minimal limiting value Imin to the maximal limiting value Imax.

That is, when at least one of the above three determination conditions (A1), (A2), (A3) is not satisfied, the value of the flag Fo switches from "1" to "0", and the value Nh held in the holding circuit 95 is reset to "0". Thereby, the count value Nf of the adder 94 becomes "0". As shown in the above graph of the upper diagram of FIG. 6, when the count value Nf is "0", the computation circuit 96 sets the maximal limiting value Imax as the limiting value Ilim2. As described above, the maximal limiting value Imax has such a large absolute value that the electric current to be supplied to the turning motor 41 by the energization control circuit 64 is not limited. Accordingly, when the contact of the turning wheels 16 with the obstacle is canceled, the electric current corresponding to the current command value computed by the energization control circuit 64 is supplied to the turning motor 41.

In this way, when the contact of the turning wheels 16 with the obstacle is canceled, the limiting value Ilim2 for protection from the obstacle is immediately restored from the minimal limiting value Imin to the maximal limiting value Imax. Thereby, it is possible to reduce a period during which turning performance decreases due to the limitation of the electric current of the turning motor 41 for protection of the turning motor 41 from overheating, to a minimal period.

Effects of First Embodiment

Thus, with the first embodiment, it is possible to obtain the following effects.

(1) The control device 50 limits the current amount to be supplied to the turning motor 41, using the limiting value that is one of the limiting values Ilim1, Ilim2 and that has the smaller absolute value. Since the current value Ib of the turning motor 41 is limited at least to the minimal limiting value Imin, the rise in the temperature of the turning motor 41 is restrained. Further, the control device 50 sets the limiting value that is one of the limiting values Ilim1, Ilim2 and that has the smaller absolute value, as the final limiting value Ilim3 that is used for the computation of the current threshold Ith, and computes the current threshold Ith having the same value as the set limiting value Ilim3. Therefore, even when the current value Ib of the turning motor 41 is limited, the current threshold Ith is not set to a value larger than the current value Ib of the turning motor 41. Accordingly, the control device 50 can properly determine that the turning wheels 16 are in touch with the obstacle.

(2) After it is determined that the turning wheels 16 are in touch with the obstacle, the computation circuit 96 gradually decreases the limiting value Ilim2 from the maximal limiting value Imax to the minimal limiting value Imin, with increase in the count value Nf. Therefore, a rapid change in the limiting value Ilim2 is restrained.

(3) The control device 50 sets the current threshold Ith to the same value as the limiting value Ilim3, using the threshold map Mth. Therefore, the threshold map Mth only needs to have a characteristic in which the current threshold Ith passes through the origin and linearly changes with change in the limiting value Ilim3, as shown by the characteristic line L1 in the above graph of FIG. 7. Therefore, the threshold map Mth can be easily constructed. In the construction of the threshold map Mth, a complex adjustment or the like is unnecessary.

However, as shown in the graph of FIG. 7, it is preferable that the current threshold Ith be set so as not to overlap with a practical-use current range RI, which is a range of the current value Ib of the turning motor 41 that can be generated in an ordinary use state of the vehicle. Examples of the ordinary use state of the vehicle include a state where the vehicle performs a grip traveling on a dry road, and a stationary steering state where the steering wheel 11 is steered while the vehicle is in the stop state. With this configuration, the control device 50 is restrained from falsely determining that the turning wheels 16 are in touch with the obstacle, in an ordinary traveling state of the vehicle. Further, in the case where the turning wheels 16 are in touch with the obstacle, the current value Ib of the turning motor 41 reaches the current threshold Ith before the current value Ib is limited to the limiting value Ilim3. Therefore, the control device 50 can determine that the turning wheels 16 are in touch with the obstacle, more properly and more quickly.

(4) When the contact of the turning wheels 16 with the obstacle is canceled, the limiting value Ilim2 for protection from the obstacle is immediately restored from the minimal limiting value Imin to the maximal limiting value Imax. Therefore, it is possible to reduce the period during which turning performance decreases due to the limitation of the electric current of the turning motor 41 for protection of the turning motor 41 from overheating, to a minimal period.

Second Embodiment

Next, a second embodiment of the steering apparatus will be described. The embodiment basically has the same configuration as the first embodiment shown in FIG. 1 to FIG. 3 described above. The embodiment is different from the first embodiment in that a configuration of excluding the limiting shaft force computation circuit 86 is employed as the vehicle model 72.

Figure 8:
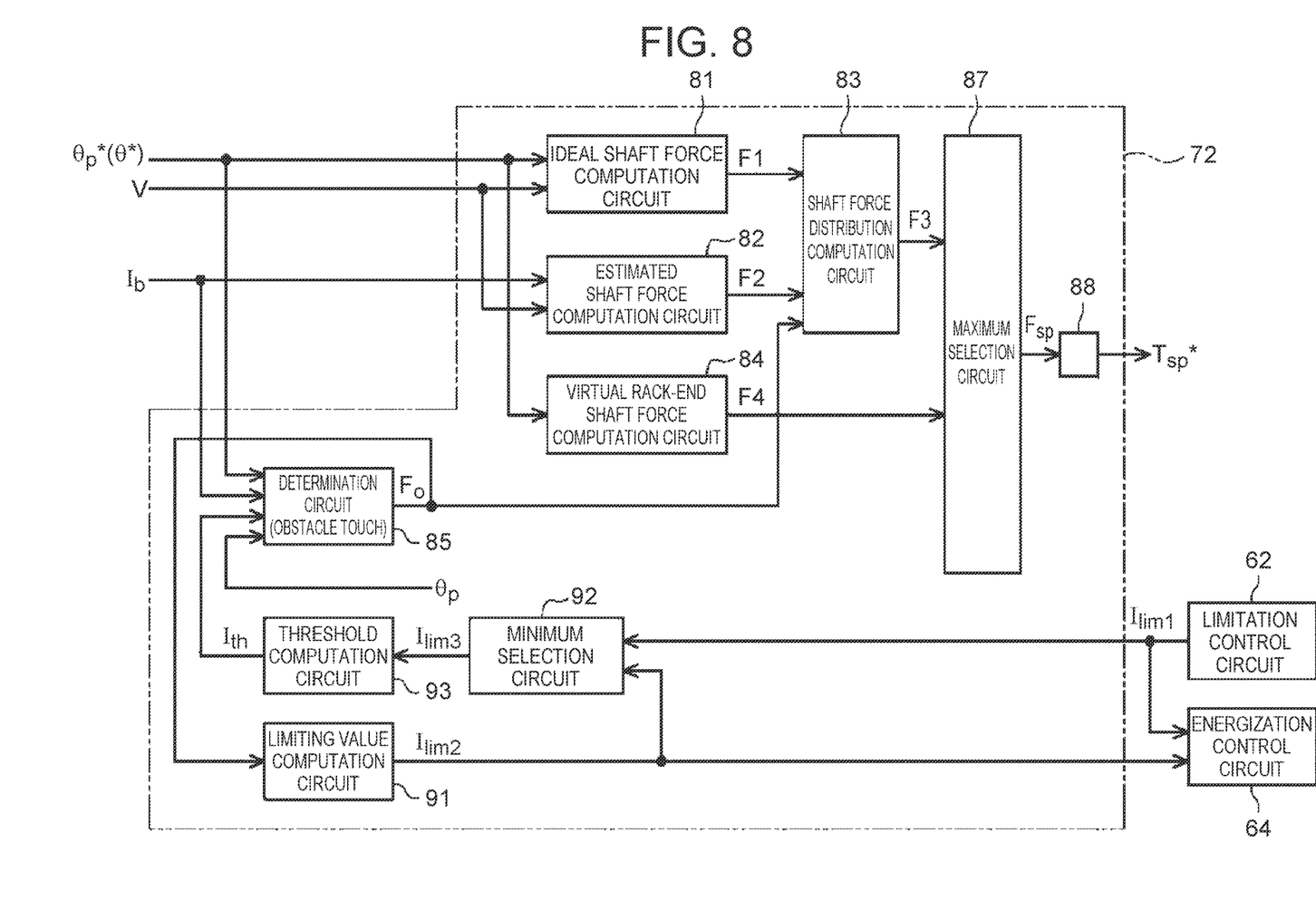
FIG. 8 is a control block diagram of a vehicle model in a second embodiment.

As shown in FIG. 8, the target steering angle computation circuit 52 includes the ideal shaft force computation circuit 81, the estimated shaft force computation circuit 82, the shaft force distribution computation circuit 83, the virtual rack-end shaft force computation circuit 84, the determination circuit 85, the maximum selection circuit 87 and the conversion circuit 88. In addition, the target steering angle computation circuit 52 includes the limiting value computation circuit 91, the minimum selection circuit 92 and the threshold computation circuit 93. When the determination circuit 85 determines that the turning wheels 16 are in touch with the obstacle, that is, when the value of the flag Fo is "1", the shaft force distribution computation circuit 83 supplies the estimated shaft force F2 to the maximum selection circuit 87, instead of the mixed shaft force F3, regardless of the vehicle behavior, the road surface state or the steering state.

In the case where the turning wheels 16 are in touch with the obstacle, the turning action of the turning wheels 16 is restricted, and thereby the actual pinion angle $\theta p$ cannot follow up the target pinion angle $\theta p^*$, so that the current value Ib of the turning motor 41 rapidly increases. That is, the current value Ib of the turning motor 41 and the estimated shaft force F2 computed based on the current value Ib of the turning motor 41 reflect the situation where the turning wheels 16 are in touch with the obstacle. Accordingly, in the case where the maximum selection circuit 87 sets the estimated shaft force F2 as the final shaft force Fsp, the spring component Tsp* based on the final shaft force Fsp is reflected in the input torque Tin*, and thereby the steering reaction force rapidly increases. Therefore, the driver has a feeling of contact as the steering reaction force, and thereby can recognize the situation where the turning wheels 16 are in touch with the obstacle such as a curbstone. Further, with the second embodiment, it is possible to obtain the same effects as the above (1) to (4) in the first embodiment.

Other Embodiments

The first and second embodiments may be carried out while being modified as follows. In the first and second embodiments, as shown by the characteristic line L1 in the above graph of FIG. 7, the current threshold Ith is set to the same value as the limiting value Ilim3. However, the current threshold Ith may be set to a value smaller than the limiting value Ilim3.

In the first and second embodiments, each of the virtual rack-end shaft force F4 and the limiting shaft force F5 is supplied to the maximum selection circuit 87, but the following configuration may be adopted. That is, the maximum selection circuit 87 is provided as a first maximum selection circuit, and a second maximum selection circuit is provided on a computation path from the virtual rack-end shaft force computation circuit 84 and the limiting shaft force computation circuit 86 to the maximum selection circuit 87. The second maximum selection circuit selects a shaft force having the largest absolute value, from the virtual rack-end shaft force F4 and the limiting shaft force F5, and sets the selected virtual rack-end shaft force F4 or limiting shaft force F5, as the shaft force that is supplied to the first maximum selection circuit (87).

In the first and second embodiments, a configuration of including an adder instead of the maximum selection circuit 87 may be employed as the vehicle model 72. The adder adds up the mixed shaft force F3, the virtual rack-end shaft force F4 and the limiting shaft force F5, and thereby computes the final shaft force Fsp that is used for the computation of the spring component Tsp* of the input torque Tin*. This configuration also can reflect the mixed shaft force F3, the virtual rack-end shaft force F4 and the limiting shaft force F5, in the steering reaction force.

In the first and second embodiments, the target steering reaction force computation circuit 51 evaluates the target steering reaction force T1* based on the steering torque Th and the vehicle speed V. However, the target steering reaction force computation circuit 51 may evaluate the target steering reaction force T1* based on only the steering torque Th.

In the first and second embodiments, the target steering angle computation circuit 52 computes the target steering angle θ* of the steering wheel 11, using the input torque Tin* that is the total of the target steering reaction force T1* and the steering torque Th. However, the target steering angle computation circuit 52 may compute the target steering angle θ* of the steering wheel 11, using only the steering torque Th or only the target steering reaction force T1* as the input torque Tin*.

In the first and second embodiments, the ideal shaft force computation circuit 81 computes the ideal shaft force F1, based on the target pinion angle θp* and the vehicle speed V. However, it is not always necessary to consider the vehicle speed V in the computation of the ideal shaft force F1. Further, the ideal shaft force F1 may be evaluated using a target turning angle that is obtained by multiplying the target pinion angle θp* by a predetermined conversion factor, instead of using the target pinion angle θp*.

In the first and second embodiments, the estimated shaft force computation circuit 82 computes the estimated shaft force F2, based on the current value Ib of the turning motor 41. However, the estimated shaft force computation circuit 82 may estimate and compute the shaft force that acts on the turning shaft 14, for example, based on a lateral acceleration or yaw rate that is detected through a sensor equipped in the vehicle. For example, the estimated shaft force can be evaluated by multiplying the lateral acceleration by a gain that is a coefficient corresponding to the vehicle speed V. Since the road surface state such as the frictional resistance of the road surface or the vehicle behavior is reflected in the lateral acceleration, the actual road surface state is reflected in the estimated shaft force that is computed based on the lateral acceleration. Further, the estimated shaft force can be evaluated, by multiplying a yaw rate differentiation value resulting from differentiating the yaw rate, by a vehicle speed gain that is a coefficient corresponding to the vehicle speed V. Since the road surface state such as the frictional resistance of the road surface or the vehicle behavior is reflected also in the yaw rate, the actual road surface is reflected also in the estimated shaft force that is computed based on the yaw rate.

In the first and second embodiments, the virtual rack-end shaft force computation circuit 84 may compute the virtual rack-end shaft force F4, using the steering angle θs and the pinion angle θp, instead of using the target steering angle θ* and the target pinion angle θp*. In this case, in the computation of the virtual rack-end shaft force F4, the virtual rack-end shaft force computation circuit 84 uses an angle that is one of the steering angle θs and the pinion angle θp and that has the larger absolute value, as a virtual rack-end angle θend.

In the first embodiment, a configuration of excluding the ideal shaft force computation circuit 81 and the shaft force distribution computation circuit 83 may be employed as the vehicle model 72. In this case, the estimated shaft force F2 computed by the estimated shaft force computation circuit 82 is supplied to the maximum selection circuit 87 with no change.

In the first and second embodiments, a configuration of excluding the virtual rack-end shaft force computation circuit 84 may be employed as the vehicle model 72. In the first and second embodiments, the three determination conditions (A1) to (A3) are set as determination conditions of whether the turning wheels 16 are in touch with the obstacle. However, it is only necessary to set at least the determination condition (A2).

In the first and second embodiments, the control device 50 calculates the steering reaction force command value T*, by adding the steering angle correction amount T2* to the target steering reaction force T1*. However, the steering angle correction amount T2* may be used as the steering reaction force command value T*. In this case, a configuration of excluding the adder 55 can be employed as the control device 50. The target steering reaction force T1* computed by the target steering reaction force computation circuit 51 is supplied to only the target steering angle computation circuit 52. The steering angle correction amount T2* as the steering reaction force command value T* computed by the steering angle feedback control circuit 54 is supplied to the energization control circuit 56.

In the first and second embodiments, a clutch may be provided in the steering apparatus 10. In this case, as shown by a two-dot chain line in FIG. 1, the steering shaft 12 and the pinion shaft 13 are coupled through a clutch 21. As the clutch 21, an electromagnetic clutch that connects and disconnects dynamic power by electric connection and disconnection of an exciting coil is employed. The control device 50 executes a connection-disconnection control to switch the clutch 21 between connection and disconnection. When the clutch 21 is disconnected, dynamic power transmission between the steering wheel 11 and the turning wheels 16 is mechanically disconnected. When the clutch 21 is connected, the dynamic power transmission between the steering wheel 11 and the turning wheels 16 is mechanically connected.

What is claimed is:

1. A steering apparatus comprising:
a mechanism configured to turn a turning wheel of a vehicle;
a first motor configured to generate a driving force that is given to the mechanism; and
a control device configured to control the first motor in accordance with a steering state, wherein
the control device includes
a first computation circuit configured to compute a first limiting value to which an electric current to be supplied to the first motor is limited in a particular situation,
a determination circuit configured to determine whether the turning wheel is in touch with an obstacle, based on comparison between a value of the electric current to be supplied to the first motor and a threshold,
a second computation circuit configured to compute a second limiting value to which the electric current to be supplied to the first motor is limited when the determination circuit determines that the turning wheel is in touch with the obstacle, and
a third computation circuit configured to compute the threshold to be used by the determination circuit, based on a smaller limiting value of the first limiting value and the second limiting value.

2. The steering apparatus according to claim 1, wherein the third computation circuit is configured to compute the threshold having a value equal to the smaller limiting value of the first limiting value and the second limiting value.

3. The steering apparatus according to claim 1, wherein the second computation circuit is configured to decrease the second limiting value from a maximal limiting value to a minimal limiting value, when the determination circuit determines that the turning wheel is in touch with the obstacle, the maximal limiting value being set based on a maximal current value that the first motor is able to apply without overheating, the minimal limiting value being set based on a minimal current value that the first motor is able to apply without overheating.

4. The steering apparatus according to claim 3, wherein the second computation circuit is configured to immediately restore the second limiting value from the minimal limiting value to the maximal limiting value, when the determination circuit cancels the determination that the turning wheel is in touch with the obstacle.

5. The steering apparatus according to claim 1, further comprising a second motor, wherein:
the mechanism includes a steering shaft configured to rotate in conjunction with an operation of a steering wheel and a turning shaft provided such that dynamic power transmission between the steering wheel and the turning shaft is separated;
the second motor is a reaction motor configured to generate a steering reaction force based on a first command value that is computed based on the steering state, the steering reaction force being a torque that is given to the steering shaft and that is in an opposite direction of a steering direction; and
the first motor is a turning motor configured to generate a turning force based on a second command value that is computed based on the steering state, the turning force being a torque that is given to the turning shaft and by which the turning wheel is turned.

6. The steering apparatus according to claim 5, wherein the control device includes a limiting shaft force computation circuit configured to compute a limiting shaft force as a shaft force of the turning shaft, as a control for informing a driver that the turning wheel is touch with the obstacle, when the determination circuit determines that the turning wheel is touch with the obstacle, the shaft force of the turning shaft being reflected in the first command value for the reaction motor for virtually limiting the operation of the steering wheel.

7. The steering apparatus according to claim 5, wherein the control device includes:
an ideal shaft force computation circuit configured to compute an ideal shaft force, the ideal shaft force being an idealized shaft force of the turning shaft based on a target rotation angle of a rotating body that rotates in conjunction with a turning action of the turning wheel;
an estimated shaft force computation circuit configured to compute a shaft force of the turning shaft as an estimated shaft force, based on a current value of the turning motor that reflects a vehicle behavior, a road surface state or the steering state; and
a distribution computation circuit configured to compute a mixed shaft force as the shaft force of the turning shaft, by mixing the estimated shaft force and the ideal shaft force based on the vehicle behavior, the road surface state or the steering state, the shaft force of the turning shaft being reflected in the first command value for the reaction motor,
the distribution computation circuit is configured to switch the shaft force of the turning shaft from the mixed shaft force to the estimated shaft force, as a control for informing a driver that the turning wheel is in touch with the obstacle, when the determination circuit determines that the turning wheel is in touch with the obstacle, the shaft force of the turning shaft being reflected in the first command value for the reaction motor.

* * * * *